United States Patent [19]

Shibuya et al.

[11] Patent Number: 5,210,651
[45] Date of Patent: May 11, 1993

[54] MOTOR DRIVEN RETRACTABLE OUTSIDE MIRROR FOR VEHICLE

[75] Inventors: Hideyuki Shibuya, Zama; Shigeki Yoshioka, Yokohama; Satoru Ichikawa; Masayuki Touda, both of Yokosuka, all of Japan

[73] Assignee: Nissan Motor Co., Ltd., Japan

[21] Appl. No.: 612,692

[22] Filed: Nov. 15, 1990

[30] Foreign Application Priority Data

Nov. 17, 1989 [JP] Japan .................................. 1-297691

[51] Int. Cl.⁵ ............................ G02B 7/18; B60R 1/06
[52] U.S. Cl. .................................... 359/841; 359/877;
248/479; 248/487; 248/900; 310/323; 310/328
[58] Field of Search ..................... 359/841, 872, 877;
248/548, 479, 487, 900; 310/311, 323, 328

[56] References Cited

U.S. PATENT DOCUMENTS

| | | | |
|---|---|---|---|
| 4,626,084 | 12/1986 | Kumai | 359/841 |
| 4,657,362 | 4/1987 | Suzuki | 359/841 |
| 4,692,000 | 9/1987 | Wada et al. | 359/877 |
| 4,798,967 | 1/1989 | Yamana et al. | 359/877 |
| 4,832,477 | 5/1989 | Torii et al. | 359/877 |
| 4,919,526 | 4/1990 | Umekawa et al. | 359/841 |
| 4,982,926 | 1/1991 | Mori et al. | 359/877 |

FOREIGN PATENT DOCUMENTS 3635746 4/1987 Fed. Rep. of Germany ...... 359/877
62-94444 4/1987 Japan .

Primary Examiner—Bruce Y. Arnold
Assistant Examiner—R. D. Shafer
Attorney, Agent, or Firm—Lowe, Price, LeBlanc & Becker

[57] ABSTRACT

A vehicle door mirror assembly has a stationary base unit, a door mirror unit mounted on the base unit so that the mirror unit is swingable about a vertical swing axis, an ultrasonic motor for supplying power to swing the mirror unit, a fixed gear fixed to the base unit, and a speed reducing gear set. The ultrasonic motor and the gear reducing gear set are both mounted on the mirror unit. The speed reducing gear set has a driving gear driven by the motor, an intermediate gear engaged with, and driven by, the driving gear, and a driven gear which is connected with the intermediate gear by a joint shaft and which is engaged with the fixed gear. When the motor drives the driving gear, the driven gear is driven by the driving gear at a reduced speed, and moves around the fixed gear to swing the mirror unit about the axis of the fixed gear. This door mirror assembly is advantageous in compactness, durability and efficiency.

22 Claims, 6 Drawing Sheets

MOTOR DRIVEN RETRACTABLE OUTSIDE MIRROR FOR VEHICLE

BACKGROUND OF THE INVENTION

The present invention relates to retractable outside rear view vehicle mirrors of, and more specifically, to vehicle door mirrors which are swingable by electrical means between an extended position and a folded position.

Japanese Patent Provisional (KOKAI) Publication No. 62-94444 shows a conventional retractable door mirror assembly. This door mirror assembly, as shown in FIG. 7, includes a mirror base 104, a swing shaft 105 fixed to the mirror base 104, a mirror housing 111 rotatably mounted on the swing shaft 105, and an ultrasonic motor (surface wave motor) 112 which is coaxial with the swing shaft 105 and which is arranged to directly rotate the mirror housing 111.

In general, a retractable mirror must have a predetermined holding torque (80 Kgfcm, for example) to withstand external forces (due to wind and collision against obstacles). In the above-mentioned conventional example, therefore, it is necessary to increase the radii of the rotor and stator of the ultrasonic motor, to increase the force of a spring for pressing the rotor on the stator, and to increase the friction between the rotor and stator. However, the large rotor and stator increases the total size of the mechanism. The strong spring tends to decrease the facility of movement of the rotor, entail additional power consumption to rotate the mirror against the strong spring force by applying a higher voltage to the piezoelectric element, and decrease the durability of the piezoelectric element. The greater frictional force between the stator and rotor decreases the durability of the mechanism.

SUMMARY OF THE INVENTION

It is an object of the present invention to provide a motor driven retractable outside rear view mirror assembly suitable for vehicles such as automobiles.

A vehicle outside rear view mirror assembly, according to the present invention, comprises a stationary base unit, a swingable mirror unit, an ultrasonic motor, a fixed gear and a speed reducing gear means. The base unit is adapted to be fixed to a portion of the vehicle body, such as a front door of the vehicle. The mirror unit is rotatably mounted on the base unit to swing about a swing axis. The ultrasonic motor is mounted on the mirror unit, and arranged to supply power to swing the mirror unit about the swing axis. The fixed gear is fixed to a portion of the base unit so that the fixed gear is stationary relative to the base unit. The speed reducing gear means is mounted on the mirror unit, and comprises a driving gear and a driven gear. The driving gear is drivingly connected with the ultrasonic motor so that the driving gear is driven by the ultrasonic motor. The driven gear is drivingly connected with the driving gear in such a manner that the driven gear is driven by the driving gear so that a rotational speed of the driven gear is lower than a rotational speed of the driving gear. The driven gear is in engagement with the fixed gear. Therefore, when the ultrasonic motor drives the driving gear, the driving gear drives the driven gear, and the driven gear moves around the fixed gear and thereby causes the mirror unit to swing about the axis of the fixed gear. The speed reducing gear means of the invention transmits an external force applied on the door mirror unit, to the rotor of the ultrasonic motor. In this case, the speed reducing gear means of the invention decreases the magnitude of the torque applied to the rotor.

DETAILED DESCRIPTION OF THE INVENTION

Figure 1:
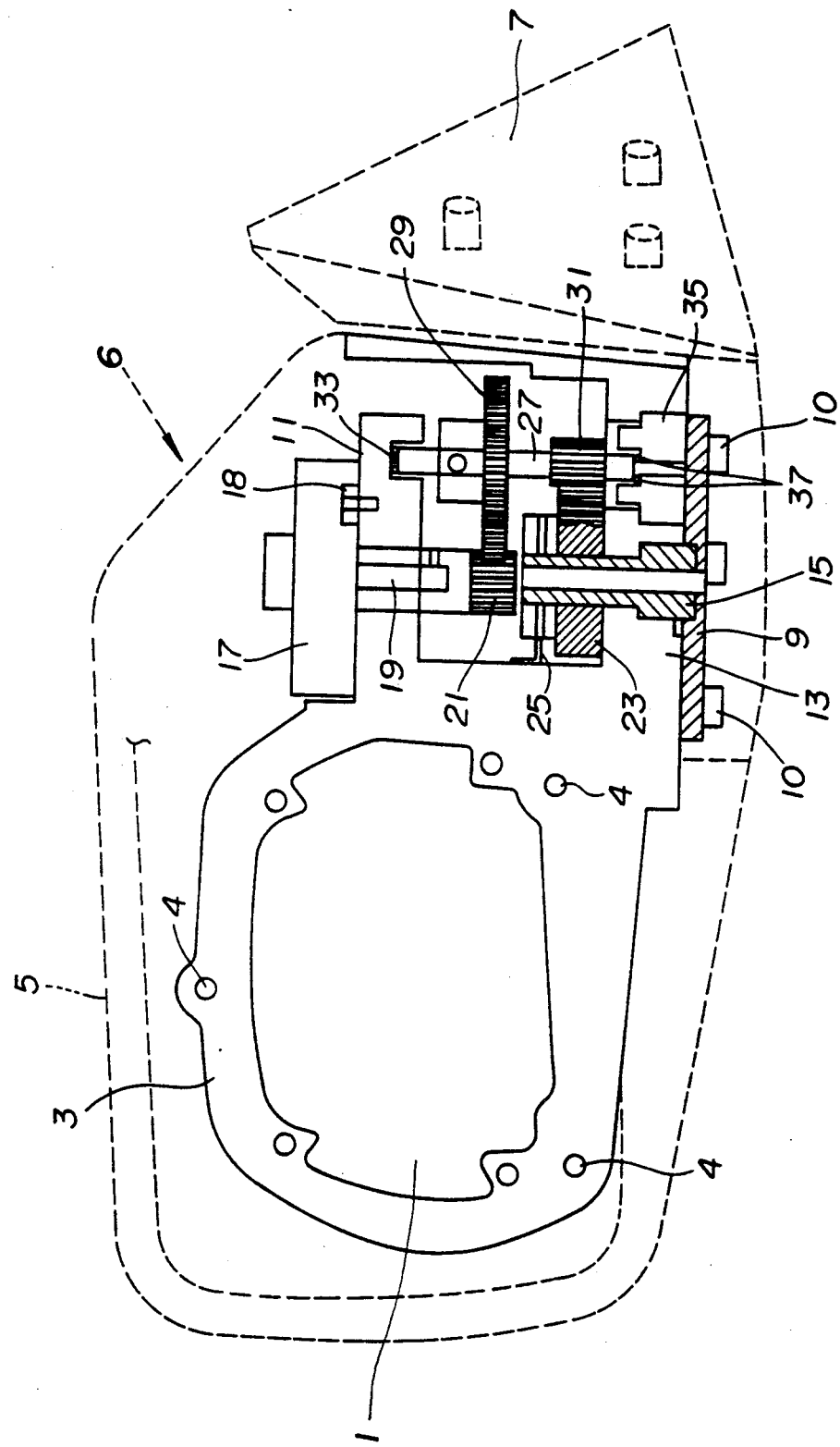
FIG. 1 is an elevational view of a vehicle outside mirror assembly according to one embodiment of the present invention.
Figure 2:
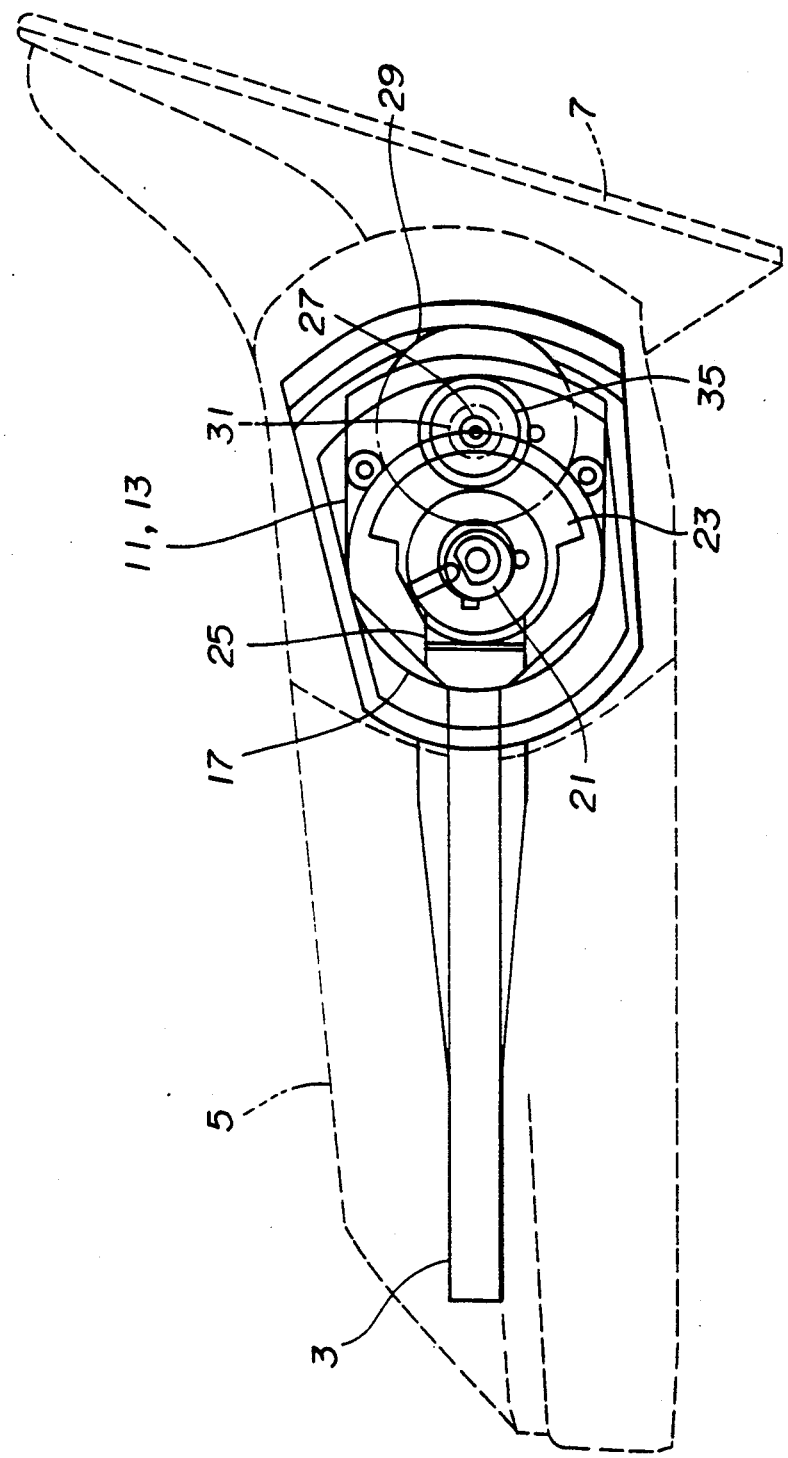
FIG. 2 is a top view of the outside mirror assembly shown in FIG. 1.

FIG. 1 shows a motor driven retractable outside rear view mirror assembly according to one embodiment of the present invention. The mirror assembly of this embodiment is a door mirror assembly for a vehicle.

The door mirror assembly includes a swingable mirror unit 6 which includes a mirror member 1 having a mirror surface, a mirror flapper 3 supporting the mirror member 1, and a mirror cover 5 covering the flapper 3. The flapper 3 is fixed to the cover 5 by screw fasteners 4.

The door mirror assembly further includes a stationary base unit 7 which is adapted to be fixed to a door of the vehicle. The base unit 7 has a lower projecting portion to which a base plate 9 is fixed by screw fasteners 10.

The mirror flapper 3 of the mirror unit 6 has first and second arms 11 and 13 which project toward the base unit 7. In this embodiment, the first and second arms 11 and 13 are made of metal. The first and second arms 11 and 13 are substantially parallel to each other. The mirror flapper 3 further has a vertically extending middle portion and a mirror supporting portion supporting the mirror member 1. The first and second arms 11 and 13 project from the middle portion in one direction, and the mirror supporting portion projects from the middle portion in the opposite direction. In this embodiment, the mirror flapper 3 is a single metal piece, and each portion is an integral part of the flapper 3. However, it is possible to form the flapper 3 by fixing a metal piece composed of the middle portion and the first and second arms 11 and 13 to a piece composed of the mirror supporting portion. The first arm 11 is located above the second arm 13.

The door mirror assembly further includes an ultrasonic motor 17. The ultrasonic motor 17 is placed on an upper surface of the first (upper) arm 11, and fixed to the first arm 11 by one or more screw fasteners 18. A drive shaft 19 of the ultrasonic motor 17 extends downwardly through a hole formed in the first arm 11, and projects below the first arm 11. A driving gear (motor gear) 21 is mounted on a lower end of the drive shaft 19 in such a manner that the driving gear 21 rotates with the drive shaft 19 as a unit. In this embodiment, the driving gear 21 is fixedly mounted on the drive shaft 19.

Alternatively, the driving gear 21 may be an integral part of the drive shaft 19, or may be mounted on the drive shaft 19 in such a manner as to permit axial movement of the driving gear 21 relative to the drive shaft 19 and to prevent relative rotational movement between the driving gear 21 and the drive shaft 19. The first arm 11 is placed between the ultrasonic motor 17 and the motor gear 21.

A center shaft 15 is inserted into a hole of the base plate 9 by press fit. The center shaft 15 is shaped to prevent relative rotation between it and the base plate 9. Therefore, the center shaft 15 cannot rotate even if torque is applied. A lower end of the center shaft 15 is thus fixed to the base plate 9 and extends upwardly from the base plate 9 through a hole formed in the second (lower) arm 13 the project above the second arm 13 toward the drive shaft 19 of the ultrasonic motor 17. The axis of the center shaft 15 is not in alignment with the axis of the drive shaft 19 of the ultrasonic motor 17. However, it is possible to align the center shaft 15 and the drive shaft 19 so that the axis of the center shaft 15 is collinear with the axis of the drive shaft (i.e. the center shaft 15 is coaxial with the drive shaft 19).

A fixed center gear 23 is fixedly mounted on an upper portion of the center shaft 15. Therefore, the fixed center gear 23 is fixed to the base unit 7, and held stationary by the center shaft 23 and the base plate 9. The fixed center gear 23 is located above the second arm 13, and the second arm 13 is located between the fixed center gear 23 and the base plate 9. A limit switch 25 is provided above the fixed center gear 23. The limit switch 25 is fixed to the mirror flapper 3 of the mirror unit.

A joint shaft 27 is rotatably supported between the first and second arms 11 and 13. The joint shaft 27 is parallel to each of the drive shaft 19 of the ultrasonic motor 17, and the fixed center shaft 15. The upper end of the joint shaft 27 is received in a recess formed in the first arm 11, and supported through a ball bearing 33 by the first arm 11. The lower end of the joint shaft 27 is supported by a cap 35 provided in the second arm 13. The cap 35 is arranged to apply a pushing force to the joint shaft 27. The cap 35 has a ball plunger 37 therein. The ball plunger 37 serves as a means for adjusting the pushing force applied by the cap 35 to the joint shaft 27, and reduce the friction. If the friction surfaces of the joint shaft 27 and the supporting portions of the first and second arms 11 and 13 are made of material having the capability of reducing friction effectively, it is possible to omit the ball bearing 33 and the ball plunger 37.

An intermediate gear (joint gear) 29 is fixedly mounted on an upper portion of the joint shaft 27, and engaged with the driving gear 21 which is fixed to the drive shaft 19 of the ultrasonic motor 17, Therefore, rotation is transmitted from the ultrasonic motor 17 through the driving gear 21 to the intermediate gear 29. The intermediate gear 29 may be fixed to the joint shaft 27 or may be an integral part of the joint shaft 27. The size of the intermediate gear 29 is greater than the size of the driving gear 21. Therefore, the driving gear 21 drives the intermediate gear 29 so that the driven intermediate gear 29 rotates at a slower speed than the driving gear 21.

A driven planet gear (or planet pinion) 31 is fixedly mounted on a lower portion of the joint shaft 27. The driven planet gear 31 may be fixed to the joint shaft 27, or may be an integral part of the joint shaft 27. The driven gear 31 is in engagement with the fixed center gear 23. The driven gear 31 is capable of rotating around the fixed center shaft 23 in an epicyclic manner. When torque is transmitted from the ultrasonic motor 17 through the driving gear 21, the intermediate gear 29 and the joint shaft 27, to the driven gear 31, the driven gear 31 applies torque to the center gear 23 which is held stationary, and rotates by reaction around the fixed center shaft 15.

The driving gear 21, the intermediate gear 29, the joint shaft 27 and the driven gear 31 function as a speed reducing gear means for reducing the angular speed of a rotational member driven by the ultrasonic motor 17.

Figure 3:
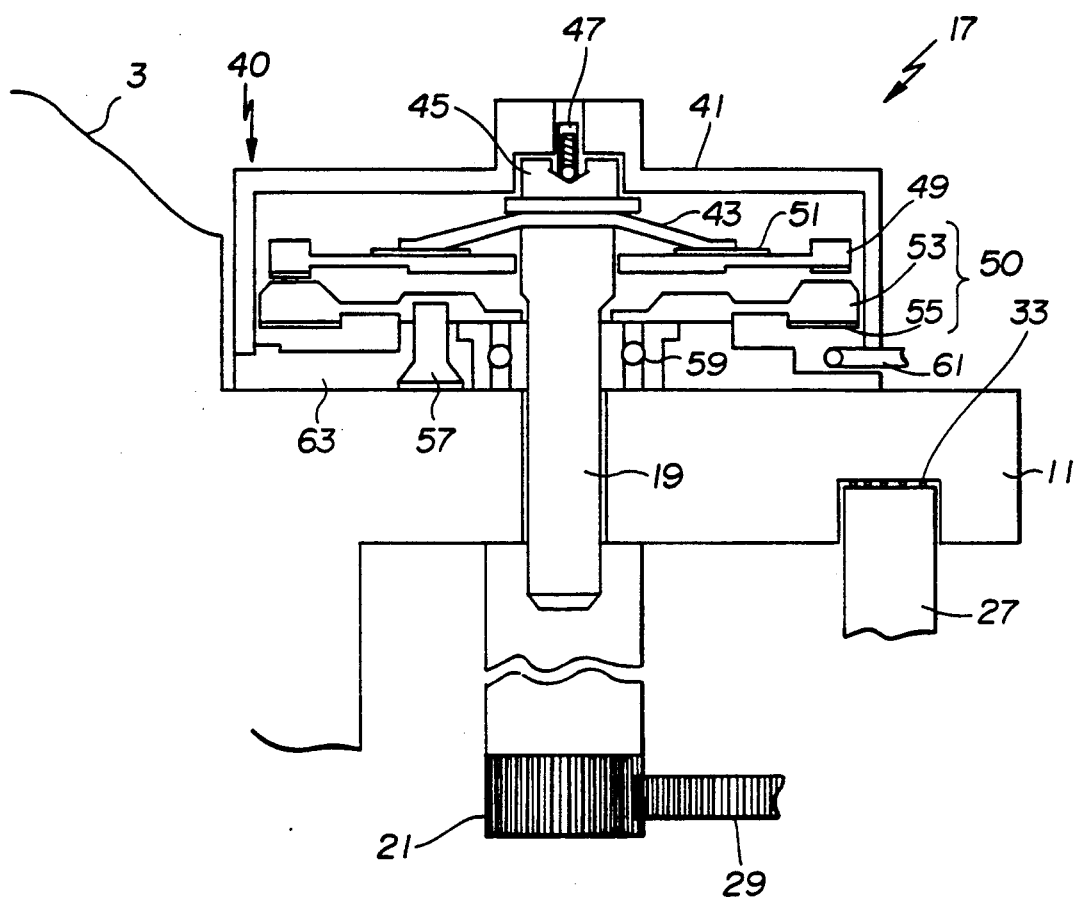
FIG. 3 is a view showing the structure of an ultrasonic motor shown in FIG. 1.

As shown in FIG. 3, the ultrasonic motor 17 has a rotor 49 and a stator 50, which are enclosed by a case 40 composed of a cover 41 and a bottom plate 63. The bottom plate 63 is in contact with the first arm 11. The case of the ultrasonic motor 17 protects the rotor 49 and the stator 50 against water, oil and dust, and thereby prevents decrease of output torque, and squeal. The bottom plate 63 serves as a cooling means for allowing heat to be absorbed by the first arm 11. The ultrasonic motor 17 is coaxially arranged around the drive shaft 19. An upper end of the drive shaft 19 is supported through a disc spring 43 and a bushing 45 by a ball plunger 47. The rotor 49 is attached to an upper portion of the drive shaft 19. The rotor 49 is supported by the disc spring 43 through a rubber member 51. The stator 50 is located under the rotor 49. The disc spring 43 is over the rotor 49, and the rotor 49 is between the disc spring 43 and the stator 50. The disc spring 43 serves as a biasing means for pressing the rotor 49 on the stator 50. The stator 50 includes an elastic member 53 and a piezoelectric member (vibrator) 55. The elastic member 53 overlies the piezoelectric member 55. The circumferential portion of the rotor 49 is pressed on the elastic member 53 of the stator 50. The drive shaft 19 is rotatably supported through a radial bearing 59 by the stator 50 and the bottom plate 63. The elastic member 53 is fixed to the bottom plate 63 by at least one screw fastener 57. A cord 61 extends between the cover 41 and the bottom plate 63. The ultrasonic motor 17 is electrically connected through the cord 61 by an external circuit.

Figure 4:
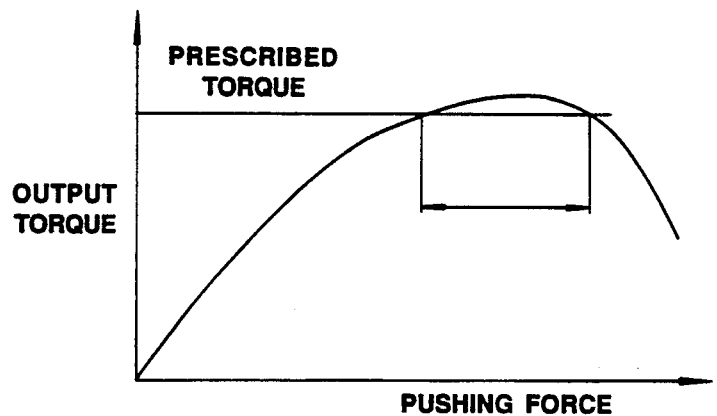
FIG. 4 is a graph showing a characteristic of the ultrasonic motor shown in FIG. 3.

The ball plunger 47 is an adjusting device for adjusting pressure to adjust the output torque of the ultrasonic motor 17. FIG. 4 shows a relationship between the motor output torque and a pushing force which is adjusted by the ball plunger 47. It is possible to make the output torque equal to or higher than a prescribed torque level by adjusting the pushing force into a predetermined normal range. The ball plunger 47 facilitates the adjustment, and makes the performance of the motor stable.

When electric drive signals are applied to the piezoelectric member 55, the piezoelectric member 55 vibrates the elastic member 53, and produces an elastic wave which propagates on the surface of the elastic member 53. As a result, the rotor 49 pressed on the elastic member 53 rotates together with the drive shaft 19, by frictional force due to the elastic wave. The ultrasonic motor (or surface wave motor, or traveling wave motor) is simple in construction, compact, light in weight, superior in response characteristic, controllability and efficiency, and silent, as is well known.

Figure 5:
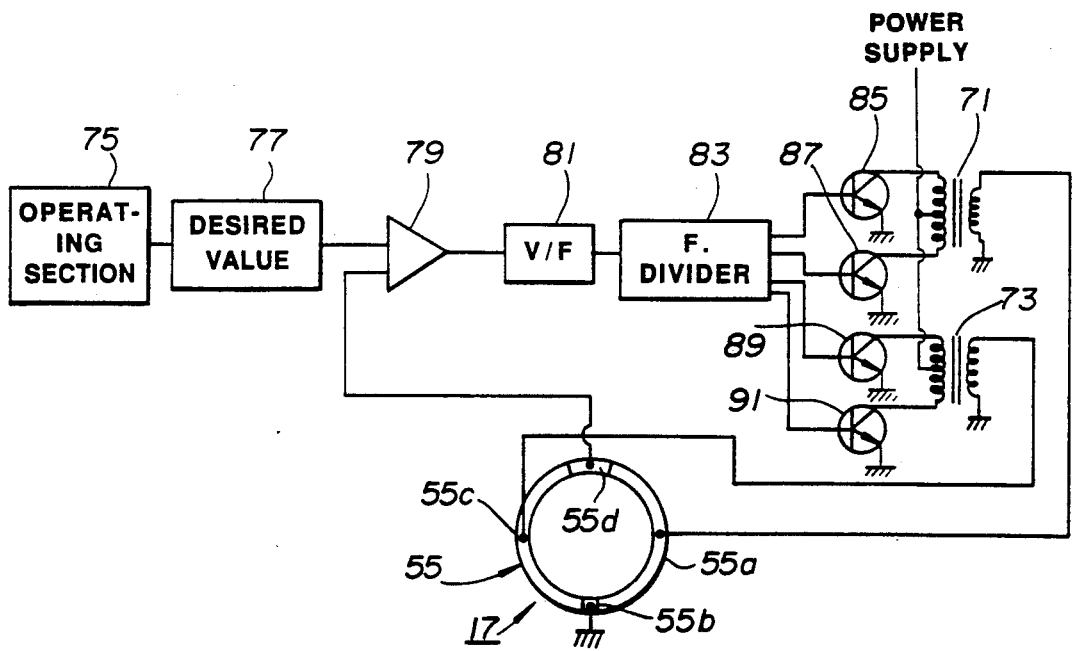
FIG. 5 is a diagram showing a control circuit for driving the ultrasonic motor shown in FIG. 3.

FIG. 5 shows a control circuit for driving the ultrasonic motor 17. As shown in FIG. 5, the piezoelectric member 55 of the ultrasonic motor 17 is shaped like a ring. The annular surface of the piezoelectric ring 55 is divided into first, second, third and fourth portions 55a, 55b, 55c and 55d each of which is bounded by two arcs of concentric circles and two straight lines. The opposite first and third portions 55a and 55c are connected, respectively, with first and second output transformers 71 and 73. The traveling wave along the circular ring is excited by applying sine wave drive signal and cosine wave drive signal whose phase difference relative to each other is 90 degrees, the first and third portions 55a and 55c. The rotational direction of the motor 17 is easily changed by reversing the drive signals supplied to the first and third portions 55a and 55c.

The second portion 55b of the piezoelectric ring 55 is grounded. The fourth portion 55d is connected to one input terminal of an operational unit 79, and arranged to supply an F/B signal. A motor operating section 75 supplies a signal through a desired value determining section 77 to the other input terminal of the operational unit 79. The operational unit 79 compares both input signals. A voltage-to-frequency (V/F) converter 81 receives the output signal of the operational unit 79, and generates a corresponding frequency signal. The voltage-to-frequency converter 81 is connected through a frequency divider 83, and power transistors 85, 87, 89 and 91, with the output transformers 71 and 73, as shown in FIG. 5.

Figure 6A:
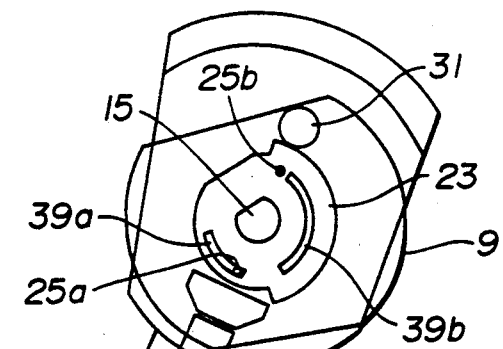
FIGS. 6(a), 6(b) and 6(c) are views for showing the mirror assembly shown in FIG. 1 in various positions.
Figure 6B:
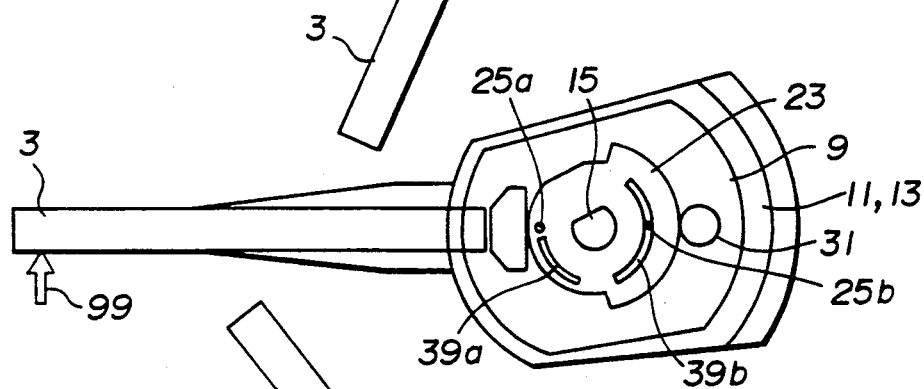
Figure 6C:
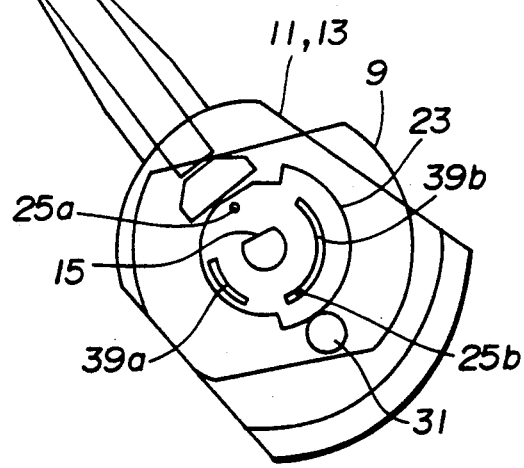
Figure 7:
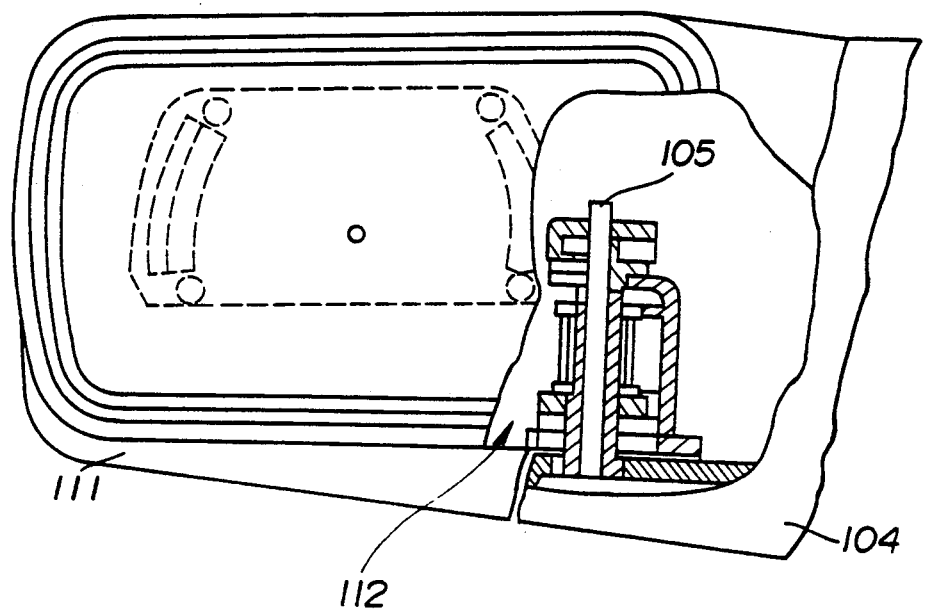
FIG. 7 is a view showing a conventional door mirror assembly.

The limit switch 25 on the upper side of the fixed center gear 23 has first and second pattern portions 39a and 39b, as shown in FIGS. 6(a), 6(b) and 6(c). The contacts 25a and 25b are fixed to the mirror flapper 3, so that the mirror flapper 3. The pattern portions 39a and 39b are fixed to the center gear 23, so that the pattern portions 39a and 39b are stationary.

When the mirror flapper 3 is an open position shown in FIG. 6(b), the first contact 25a is out of contact with the first pattern portion 39a, and the second contact 25b is in contact with the second pattern portion 39b. In this state, the limit switch 25 permits the driver of the vehicle of close the mirror unit 6 by operating a closing switch (not shown). When the mirror flapper 3 is in a closed position with the first pattern portion 39a, and the second contact 25b is out of contact with the second pattern portion 39b. In the state, the limit switch 25 permits the driver to open the mirror unit 6 by operating an opening switch (not shown).

The door mirror assembly of this embodiment is operated as follows:

When the swingable mirror unit 6 is in the open position shown in FIG. 6(b), and the closing switch is in the on state, then the control circuit delivers the drive signals for the closing operation, through the second contact 25b and the second pattern portion 39b, to the ultrasonic motor 17. Therefore, the ultrasonic motor 17 rotates its drives shaft 19 in the clockwise direction in FIG. 6(b). This rotation is transmitted from the drive shaft 19 through the driving gear 21 and the intermediate gear 29, to the joint shaft 27, so that the joint shaft 27 tries to rotate about its own axis in the counterclockwise direction. However, the driven gear 31 of the joint shaft 27 cannot rotate the center gear 23 which is fixed by the base plate 9, and therefore, the driven gear 31 rotates by reaction about the axis of the center gear 23 in the epycyclic manner. As a result, the joint shaft 27 causes the mirror flapper 3 to swing from the open position shown in FIG. 6(b) to the closed position shown in FIG. 6(a).

When the mirror unit 6 is in the closed position shown in FIG. 6(a), and the opening switch is in the on state, then the control circuit delivers the drive signals for the opening operation, through the first contact 25a and the second pattern portion 39a to the ultrasonic motor 17, and causes the drive shaft 19 to rotate in the counterclockwise direction. Therefore, the driven gear 31 of the joint shaft 27 rotates around the fixed center shaft 23 in the clockwise direction, and causes the mirror flapper 3 to swing from the closed position to the open position.

When the external force 99 is applied to the mirror flapper 3, as shown in FIG. 6(b), by accident, the mirror flapper 3 receives a torque tending to rotate the mirror flapper 3 about the center shaft 15 in the clockwise direction. Therefore, the driven gear 31 rotates about its own axis in the counterclockwise direction and at the same time rotates around the center gear 23 in the clockwise direction toward a position shown in FIG. 6(c). During this movement, the joint shaft 27 and the intermediate gear 29 rotate as a unit with the driven gear 31, and apply a torque tending to rotate the driving gear 21 in the clockwise direction. If the torque is smaller than a predetermined magnitude, however, the driving gear 21 is held stationary by the rotor 49 which is pressed on the stator 50. If the torque is greater than a predetermined magnitude, the rotor 49 starts slipping on the stator 50, and rotates. As a result, the mirror flapper 3 swings from the open position shown in FIG. 6(b) to the position shown in FIG. 6(c).

When the mirror unit 6 collides with an obstacle approaching from the direction opposite to the arrow 99 shown in FIG. 6(b), the mirror flapper 3 receives a torque in the opposite direction, and the rotor 49 of the ultrasonic motor 17 rotates in the same manner.

In the position shown in FIG. 6(c), the second contact 25b is in contact with the second pattern portion 39b, so that the driver can readily return the mirror unit 6 to the normal position by turning on the manual switch. Similarly, the driver can return the mirror unit 6 to the open position even when the mirror unit 6 is swung to the closed position by an external force.

According to Japanese safety standard, door mirrors must fall by the force equal to or lower than 20 kg when a circular column having a diameter of $\phi 160$ strikes from the front of the vehicle toward the rear. Therefore, when the column strikes against a door mirror at a middle point which is 10 cm apart from the swing axis of the door mirror, the door mirror is required to fall by a torque equal to or smaller than 250 Kgfcm. On the other hand, the door mirror must have a holding torque equal to or greater than 50 Kgf cm in order to maintain a correct angular position against wind pressure and vibrations of the vehicle body. Furthermore, it is required to set the holding torque lower than 100 Kgfcm in order to facilitate manual operation of the door mirror. Between 50 and 100 Kgfcm, the optimum holding torque is about 80 kgfcm since the safety factor is improved by making the holding torque sufficiently higher than the minimum level of 50 kgfcm. In the present invention, the gear ratio of the driving gear 21 and the intermediate gear 29 is determined in accordance with the optimum holding torque. When, for example, the holding torque of the ultrasonic motor is 5 kgfcm, then the gear ratio is 1:16.

The vehicle of this embodiment has not only the left door mirror assembly shown in FIG. 1, but also the right door mirror assembly. Both assemblies are designed and arranged in the manner of bilateral symmetry. It is possible to arrange the limit switch 25 so that the contacts 25a and 25b are stationary and the pattern portions 39a and 39b are movable.

In the door mirror assembly of this embodiment, the speed reducing gear set of the driving gear 21 and the intermediate gear 29 transmits the output rotation of the ultrasonic motor 17 to the joint shaft 27 in such a manner that the rotational speed of the joint shaft 27 is lower than the rotational speed of the drive shaft 19 of the ultrasonic motor 17. Furthermore, this gear set transmits an external force applied on the door mirror unit 6, to the rotor 49 of the ultrasonic motor 17 in such a manner that the rotor 49 receives a reduced force. Therefore, it is possible to determine the holding torque by not only the factors of the ultrasonic motor 17 (such as the frictional force between the rotor and stator, the magnitude of the spring force for pressing the rotor, and the diameter of the rotor), but also the gear ratio of the speed reducing gear mechanism. As a result, the door mirror assembly of the invention can make the design of the ultrasonic motor freer by allowing a choice of the gear ratio, and thereby prevents an increase of the motor size, an increase of the power consumption and a decrease of the durability of the ultrasonic motor.

The gear mechanism of this embodiment is compactly arranged between the first and second parallel arms 11 and 13, and does not project upwardly. Therefore, the door mirror assembly of this embodiment can decrease the vertical size, increase the flexibility of design, reduce the wind noise, and improve the aerodynamic property. The compact gear mechanism can afford more space for other components within the mirror unit.

The speed reducing gear mechanism of the invention allows a free choice of the gear ratio. Therefore, motors of a single type and driving circuits of a single type can be used in common for various types of door mirror assemblies. Furthermore, the speed reducing gear mechanism makes it possible to obtain relatively high holding torque and output torque without increasing the diameter of the ultrasonic motor.

In the present invention, the ultrasonic motor is separate from the joint shaft 27 and the center shaft 15. This arrangement facilitates the detection of the optimum value of the pressing force of the motor and the adjustment of the motor, and accordingly stabilizes the performance. Furthermore, this arrangement enables the adjustment of the pressing force of the motor and the tuning operation of the driving circuit in the state in which the motor is not yet assembled. Therefore, the door mirror assembly of the embodiment improves the efficiency of the assembly process and makes it easier to prevent deviation of resonance frequency.

The joint shaft 27 is supported at both ends by the first and second arms 11 and 13. Furthermore, the drive shaft 19 of the ultrasonic motor 17 is supported by the first arm 11, and the center shaft 15 is located by the hole of the second arm 13. Therefore, it is easy to correctly position these shafts in parallel to each other. This design of the invention makes the machining operation easier, and contributes to reduction of noise and wear of gears. Furthermore, the shaft supporting structure of the first and second arms 11 and 13 can prevent swirling of shafts and stabilize the load of the motor, so that the speed and torque of the motor are stable and the controllability is improved. This supporting structure can maintain the accuracy of the engagement among gears, and improve the gear contact ratio.

The first arm 11 functions as a means for cooling the ultrasonic motor 17, and thereby improve the durability of the motor. Furthermore, the number of required comprising parts is relatively low, so that the mirror assembly is advantageous in manufacturing cost. The door mirror assembly utilizes slippage between the rotor and stator of the ultrasonic motor when an external force is applied to the mirror unit, and does not require any clutch mechanism. The ultrasonic motor employed in the invention is low in noise, and superior in response characteristic, controllability and efficiency. The casing consisting of the cover 41 and the bottom plate 63 encloses the ultrasonic motor 17, and reliably protects the friction surfaces of the rotor and stator.

What is claimed is:

1. A vehicle door mirror assembly comprising:
   a base unit for mounting said mirror assembly on a vehicle body;
   a mirror unit mounted on said base unit for swinging movement about a swing axis on the base unit;
   an ultrasonic motor, mounted on said mirror unit, for supplying power to force said mirror unit to swing, said ultrasonic motor including a drive shaft, a rotor for rotating said drive shaft, and a stator having an elastic member and a piezoelectric vibrator for generating a circular traveling wave, and a biasing means for pressing said rotor on said stator, said stator being fixed to said mirror unit;
   a fixed gear fixed to said base unit; and
   a speed reducing gear arrangement mounted on said mirror unit, said speed reducing gear arrangement including a driving gear driven by said drive shaft of said ultrasonic motor, and a driven gear means for being driven by said driving gear at a rotational speed lower than a rotational speed of said driving gear and said driven gear means is in engagement with said fixed gear to thereby rotate around said fixed gear and cause said mirror unit to rotate about said swing axis.

2. The vehicle door mirror assembly according to claim 1, wherein said driving gear is coaxial with said drive shaft and rotatable with said drive shaft as a unit.

3. The vehicle door mirror assembly according to claim 2, wherein said driven gear means is supported by said mirror unit and is rotatable about an axis of said driven gear means, and wherein the axis of said driven gear means is held stationary relative to said mirror unit and swingable with said mirror unit as a unit, said driven gear means moving around said fixed gear in epicyclic movement and causing said mirror unit to swing about an axis of said fixed gear when said driven gear means is driven by said ultransonic motor through said driving gear.

4. The vehicle door mirror assembly according to claim 3, wherein the axis of said driven gear means is separate from said drive shaft and parallel to said drive shaft.

5. The vehicle door mirror assembly according to claim 4, wherein said driven gear means further comprises an intermediate gear and a driven gear connected to the intermediate gear, said intermediate gear being engaged with said driving gear for transmitting torque from said driving gear to said driven gear.

6. The vehicle door mirror assembly according to claim 5, wherein said driven gear means further comprises a joint shaft connecting said intermediate gear and said driven gear for transmitting torque from said intermediate gear to said driven gear, each of said intermediate gear and said driven gear being coaxial with said joint shaft.

7. The vehicle door mirror assembly according to claim 6, wherein said joint shaft is supported by said mirror unit and is rotatable about an axis of said joint shaft, and the axis of said joint shaft is held stationary relative to said mirror unit.

8. The vehicle door assembly according to claim 7, wherein said mirror unit comprises a first arm which supports said ultrasonic motor, said driving gear, and a first end of said joint shaft, and a second arm which supports a second end of said joint shaft.

9. The vehicle door assembly according to claim 8, wherein said driving gear, said joint shaft and said fixed gear are placed between said first and second arms, and said intermediate gear and said driven gear are mounted on said joint shaft.

10. The vehicle door mirror assembly according to claim 9, wherein said base unit comprises a base plate and a center shaft which extends substantially vertically through a hole formed in said second arm, and which is fixed to said base plate, said fixed gear being fixedly mounted on said center shaft.

11. The vehicle door mirror assembly according to claim 10 wherein said first and second arms extend between said ultrasonic motor and said base plate.

12. The vehicle door mirror assembly according to claim 11, wherein each of said first and second arms is made of metal.

13. The vehicle door mirror assembly according to claim 12, wherein said ultrasonic motor further comprises a case enclosing said rotor and said stator, said case comprising a bottom portion which is sandwiched between said stator and said first arm so that heat is transferred from said stator to said first arm.

14. The vehicle door mirror assembly according to claim 13 wherein said mirror unit comprises a mirror flapper from which said first and second arms project in parallel to each other.

15. The vehicle door mirror assembly of claim 1, wherein said fixed gear is non-rotatable relative to said base unit;, and said swing axis is coincident with an axis of said fixed gear; and wherein said ultrasonic motor is located above said fixed gear, and an axis of said ultrasonic motor and the axis of said fixed gear are parallel to each other.

16. The vehicle door mirror assembly according to claim 15, wherein said driving gear is coaxial with said ultrasonic motor, and located immediately adjacent to and above said fixed gear, said swing axis passing through said driving gear.

17. The vehicle door mirror assembly according to claim 16, wherein said driven gear means further comprises a joint shaft for transmitting torque from said driving gear to a driven gear of the driven gear means, said joint shaft being parallel to each of said ultrasonic motor axis and said fixed gear axis.

18. The vehicle door mirror assembly according to claim 17, wherein said driven gear means further comprises an intermediate gear which is in direct engagement with said driving gear and which is greater in diameter than said driving gear, said intermediate gear and said driven gear being both fixedly mounted on said joint shaft.

19. The vehicle door mirror assembly according to claim 15, wherein the axis of said ultrasonic motor is parallel to, and not coincident with, the axis of said fixed gear.

20. The vehicle door mirror assembly according to claim 15, wherein the axis of said ultrasonic motor is substantially in alignment with the axis of said fixed gear.

21. A vehicle door mirror assembly comprising:
a base unit;
a mirror unit swingably mounted on said base unit;
an ultrasonic motor mounted on said mirror unit for supplying power to force said mirror unit to swing about a swing axis on the base unit;
a fixed gear mounted on said base unit and which is non-rotatable relative to said base unit; and
a speed reducing gear system mounted on said mirror unit, said speed reducing gear system including a driving gear drivingly connected with said ultrasonic motor, and a driven gear means for being driven by said ultrasonic motor through said driving gear at a rotational speed lower than a rotational speed of said driving gear and said driven gear means is in direct engagement with said fixed gear, said driven gear means rotating around said fixed gear and causing said mirror unit to swing about said swing axis and said swing axis is coincident with an axis of said fixed gear;
wherein said ultrasonic motor is located above said fixed gear, and an axis of said ultrasonic motor and the axis of said fixed gear are parallel to each other, wherein said fixed gear is mounted on a center shaft which is fixed to said base unit, and said ultrasonic motor comprises a drive shaft, a rotor for rotating said drive shaft, and a stator which comprises an elastic member and a piezoelectric vibrator for generating a circular traveling wave, and said stator is fixed to said mirror unit, and a biasing means for pressing said rotor on said stator, and wherein said driving gear is fixedly mounted on said drive shaft of said ultrasonic motor and placed just above said center shaft, said driving gear comprising a downwardly facing surface confronting a top end of said center shaft.

22. The vehicle door mirror assembly according to claim 21, wherein said mirror unit comprises a mirror flapper comprising an upper arm comprising a hole receiving said drive shaft of said ultrasonic motor, and a lower arm comprising a hole receiving said center shaft, said ultrasonic motor being mounted on said upper arm, and said speed reducing gear system being placed between said upper and lower arms.

* * * * *